ELECTRICAL APPARATUS

Original Filed Jan. 15, 1954 2 Sheets-Sheet 1

INVENTOR.
Ralph Board.
BY.
Thiess, Olson, Mecklenburgh, von Hoelst, & Coltman. Attys.

ELECTRICAL APPARATUS

Original Filed Jan. 15, 1954 2 Sheets-Sheet 2

INVENTOR.
Ralph Board.
BY
Thies, Olson, Mecklenburg, von Holst, & Oltman. Attys.

United States Patent Office

Re. 24,342

Reissued Aug. 6, 1957

24,342

ELECTRICAL APPARATUS

Ralph Board, Park Ridge, Ill., assignor to Sun Electric Corporation, Chicago, Ill., a corporation of Delaware Original No. 2,703,376, dated March 1, 1955, Serial No. 404,162, January 15, 1954. Application for reissue February 25, 1957, Serial No. 642,327

4 Claims. (Cl. 315—219)

Figure 1:
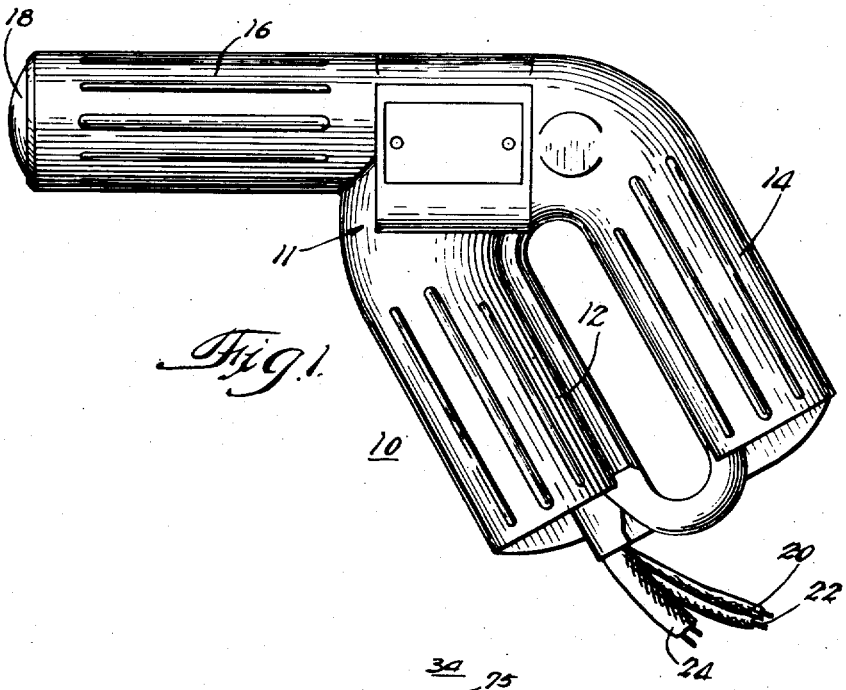

Matter enclosed in heavy brackets [ ] appears in the original patent but forms no part of this reissue specification; matter printed in italics indicates the additions made by reissue.

This invention relates to improved electrical apparatus adapted for operation from any one of a plurality of voltage sources, and more particularly to an improved timing light and a power supply therefor which is operable from any one of a plurality of voltage sources.

It is a principal object of this invention to provide means by which electrical apparatus may be operated from any one of a plurality of input voltages while maintaining predetermined output voltages and operating characteristics.

It is a further object of this invention to provide an improved timing light adapted for operation from any one of a plurality of known voltage sources.

In the automotive art one of the most important adjustments of an engine required to produce optimum operating conditions involves the determination of the timing of spark ignition relative to engine rotation. This is necessary to initiate burning of the gasoline and air mixture within a particular cylinder at the proper point in the piston motion to insure maximum energy output.

To insure proper timing a device is provided by this invention which is primarily energized from the automobile's electrical system and is triggered at predetermined intervals to emit a light flash. This triggering is accomplished by an electrical connection to a source of extremely high voltage such as the spark voltage applied to one preselected cylinder. It is a recent trend in automobile electrical systems to use higher voltages whereby a more compact power pack may be utilized with improved starting characteristics. While heretofore all standard automobiles in the United States have employed a six-volt power supply, several manufacturers have currently developed a twelve-volt system.

It is, therefore, a further object of this invention to provide a timing light and an improved power supply therefor which may be operated from a plurality of voltage sources, and especially from six and twelve-volt sources.

It is a further object of this invention to provide an improved electrical device for operation from a plurality of selected voltages which will automatically adjust for proper operation from the applied voltage.

It is another object of this invention to provide an improved timing light for operation from six to twelve volt D. C. power sources.

It is an additional object of this invention to provide a simple, rugged device adapted for use in automobile repair shops and the like which will automatically produce a predetermined output voltage for a plurality of known applied voltages.

It is still another object of this invention to provide an electrical timing light adapted for automatic operation from any one of a plurality of known voltage sources whereby it will be safe and not subject to burn-out or other failure as a result of the application of excess voltages of contemplated values.

Further and additional objects of this invention will become manifest from a consideration of this description, the accompanying drawings, and the appended claims.

In one form of this invention, an improved timing light is provided having a power supply which includes a relay connected across the input terminals thereof sensitive to voltages in excess of a first predetermined value whereby the system may be operated from said first predetermined value to produce known output voltages while application of a voltage source in excess of said predetermined value will cause actuation of the relay to alter the circuit of said timing light to maintain the output voltages at the desired values. More particularly, transfer switch means is operated by said relay whereby an associated transformer is energized in such a manner that the number of turns in the primary circuit will be proportional to the applied voltage and consequently other portions of the circuit will be energized with predetermined fixed voltages, irrespective of the applied voltage.

Figure 3:
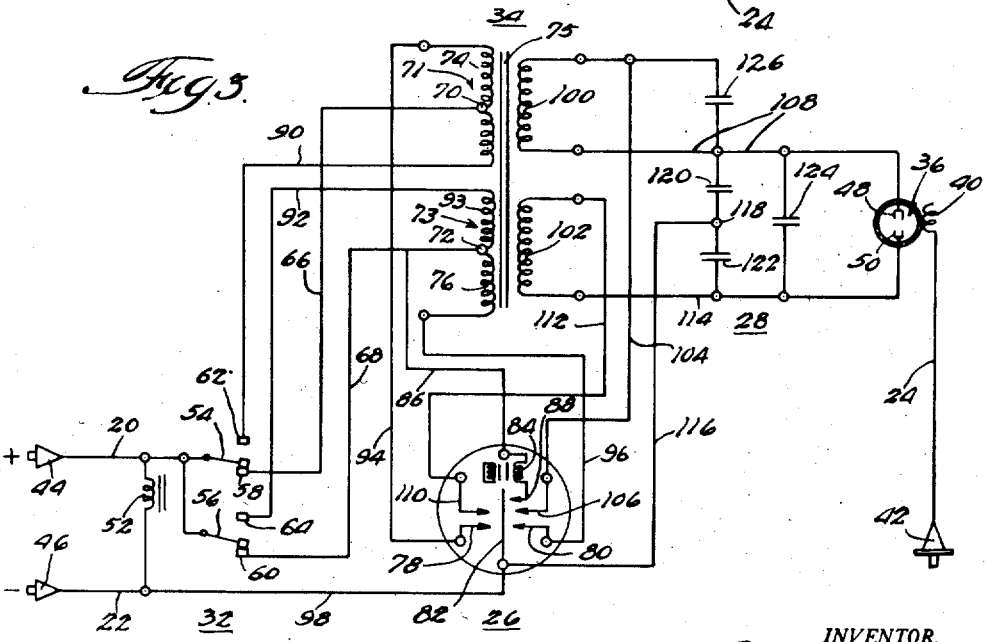
Figure 2:
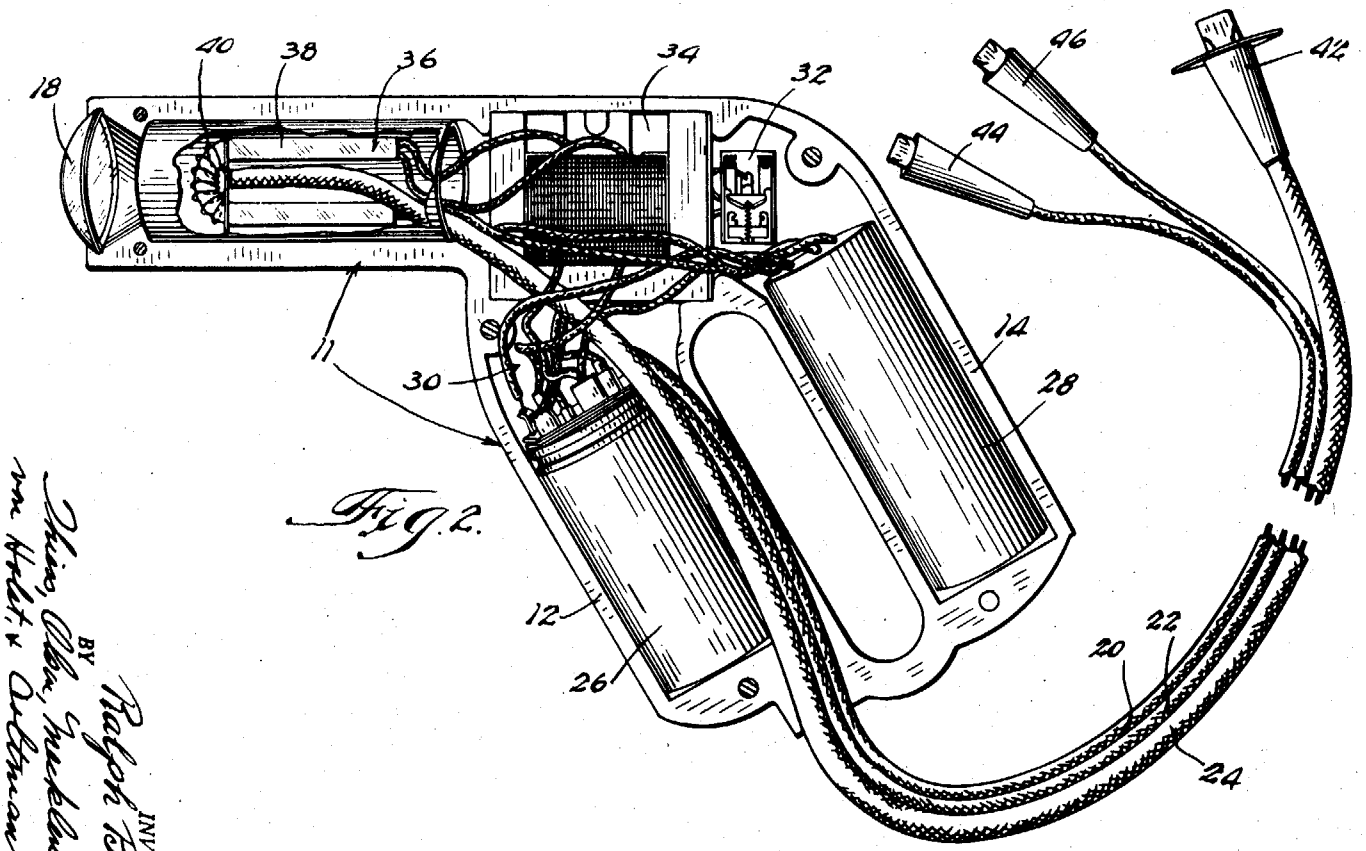

For a more complete understanding of this invention, reference should be made to the accompanying drawings, wherein Figure 1 is a plan view of a timing light incorporating the novel features of this invention;

Fig. 2 is a plan view on a larger scale of the embodiment of Fig. 1 with portions thereof removed to illustrate the circuit elements contained therein; and Fig. 3 is a schematic diagram illustrating the electrical circuitry contained within the embodiment of Fig. 1.

Referring now to the drawings, and more particularly to Figs. 1 and 2, a gun-like timing light 10 is illustrated having a casing 11, preferably of a phenolic material and including handle portions 12 and 14 and barrel portion 16 extending outwardly therefrom. A lens 18 is secured at the open end of barrel 16 whereby the light emitted by the device 10 will be collimated into a substantially parallel beam. A pair of low voltage leads 20 and 22 and a high voltage trigger lead 24 are partially shown in Fig. 1 entering the handle 12 to supply electrical energy for the timing light 10. When the apparatus is in use, the leads 20 and 22 are connected to the battery terminals of the automobile under test and the high voltage lead 24 is connected to one of the spark plug terminals thereof. The low voltage leads provide a supply of energy to produce a light impulse each time the timing light is triggered through lead 24. The light impulse is collimated through lens 18 and directed to indicia, generally on the engine fly wheel, which indicates the exact position of the engine at the instant the timing light is triggered. As a result of the repetition rate of these impulses and the persistence of human vision, the fly wheel appears to stop in the position corresponding to the firing instant.

As shown in Fig. 2, a vibrator or circuit interrupter 26 is contained within the handle portion 12, and a cylindrical condenser 28, preferably a large capacitance electrolytic condenser, is contained within the handle portion 14. These circuit elements are appropriately wired through conductors 30 to a voltage-sensitive relay 32, a transformer 34, and a gas-filled flash tube 36 which comprises a light source. These elements constitute the basic electrical structure as will be described in greater detail with respect to Fig. 3.

The light source 36 comprises a glass tube 38 formed into a generally U shape and having a pair of electrodes disposed in the legs thereof. A trigger coil 40 is wound about the curved portion of the tube and is connected to the high voltage conductor 24 which has a clip 42 connected to the free end thereof adapted to engage a spark plug lead of an engine under test. The system is designed to produce a voltage between the electrodes of the gas tube 36 which will be insufficient to initiate ionization of the gas and thus will not cause electrical discharge between the electrodes and consequent illumination. However, energization of the trigger coil 40 with a high voltage discharge from the associated spark plug will produce sufficient current by capacitive coupling through the tube 36 to ionize the gas contained therein and produce a low impedance discharge path between the electrodes and consequently a high intensity light. The light thus produced will pass through and be collimated by the convex lens 18. Clips 44 and 46 are provided at the free ends of low voltage conductors 20 and 22 for engagement with the battery terminals of an engine under test to provide the main source of power for the gas tube 36.

For a more complete understanding of the electrical circuitry utilized in the embodiment herein described, reference should be made to Fig. 3. Therein the low voltage clips 44 and 46 are shown connected through conductors 20 and 22 to the voltage selecting relay 32. The contacts of relay 32 are appropriately connected to the transformer 34 having two center tapped primaries and two associated secondaries. A rectifying vibrator 26 is provided in series with the transformer primaries and secondaries whereby the primary current is periodically interrupted and secondary circuits correspondingly interrupted to produce a high voltage D. C. output. The secondaries of transformer 34 are connected to appropriate sections of condenser 28 to function as a voltage doubler and energy storage device. Light source 36 has its main electrodes 48 and 50 connected to the terminals of a condenser 28 whereby the energy stored therein is discharged through the gas filled envelope when appropriately triggered by trigger coil 40. As explained above, trigger coil 40 is energized through high voltage conductor 24 and clip 42 which is normally connected to the lead associated with the first spark plug of an engine under test.

The particular system herein described is especially adapted for operation from either six or twelve-volt supplies, which are the two systems currently employed in American automobiles. The clips 44 and 46 are connected to the battery terminals of an automobile under test. If the subject automobile utilizes a 6 volt system the coil 52 will not actuate the associated contacts, while if the automobile under test has a twelve-volt system the coil 52 of relay 32 will effect actuation of the movable transfer contacts 54 and 56 from the normally closed contacts 58 and 60 to engage the respective normally open contacts 62 and 64. Generally the relay 32 is designed for actuation on about 9 volts to insure proper operation at both preselected levels. The normally closed contacts 58 and 60 are connected through conductors 66 and 68 to the center taps 70 and 72 of primary windings 71 and 73 of transformer 34. Thus, for voltages of the order of six volts applied to the terminals 44 and 46 the relay 32 is not actuated, and voltage is applied through center taps 70 and 72 to only the halves 74 and 76 of the primary windings of the transformer 34. The other terminals of the normally energized halves 74 and 76 of the primary windings are connected to fixed contacts 78 and 80 within the vibrator 26 through conductors 94 and 96. The vibrator 26 has a conducting vibratory reed 82 which is actuated by a coil 84 energized through conductor 86 which is, in turn, connected to conductor 68. The coil is thereby energized in parallel with the half 76 of the primary winding of transformer 34. Thus, in operation on voltages of the order of six volts, coil 84 of the vibrator 26 is energized with a six-volt supply and effects motion of reed 82 to the left in Fig. 3 to open the circuit between the reed and contact 88. The vibrator circuit may be traced as follows when the apparatus is energized from a 6 volt supply: From clip 44 through conductor 20, movable transfer contact 56, normally closed contact 60, conductors 68 and 86, vibrator coil 84, intermittent contact 88, reed 82 and conductors 98 and 22 to clip 46. Similarly the first primary circuits may be traced from clip 44 through conductor 20, contacts 56 and 60, conductor 68, primary section 76, conductor 96, intermittently engaged contact 80, reed 82 and conductors 98 and 22 to clip 46. The second primary circuit may be traced from clip 44 through conductor 20, contacts 54 and 58, conductor 66, primary section 74, conductor 94, vibrator contact 78, reed 82 and conductors 98 and 22 to clip 46.

If a supply is connected between the input terminals 44 and 46 of the order of twelve volts the relay coil 52 is actuated and the movable contacts 54 and 56 move to engage the normally open contacts 62 and 64. This will apply a twelve-volt signal to the entire primary windings 71 and 73 of transformer 34 through conductors 90 and 92 respectively. The circuit for primary windings 71 for 12 volt operation may be traced from clip 44 through conductor 20, contacts 54 and 62, conductor 90, winding 71, conductor 94, contact 78, reed 82 and conductors 98 and 22 to clip 46. The vibrator circuit may be traced from clip 44 through conductor 20, contacts 56 and 64, conductor 92, primary winding section 93, conductor 86, vibrator coil 84, contact 88, reed 82, and conductors 98 and 22 to clip 46. Thus, when the system above described is operating on voltages of the order of twelve volts the number of turns in the primary circuits of transformer 34 is substantially doubled, thus producing the same voltage in the secondary windings as is produced when the system is connected to a six-volt supply and the relay 32 remains unactuated. (This is believed well understood from a consideration of simple transformer theory.) When operating on a twelve-volt system coil 84 of the vibrator 26 continues to be operated through conductor 86 which is connected to the center tap of the primary winding 73, and thus the primary winding 73 functions as a voltage divider supplying a voltage at its center tap equal to one-half the applied voltage, or six volts, in the embodiment herein described. The impedance of coil 84 must be high relative to the impedance of primary 73.

Secondary winding 100, primary winding 71, secondary winding 102 and primary winding 73 are all electromagnetically linked through iron core 75. The orientation of the coils must be such that the fluxes and flux changes will be in aiding relationship. The voltage produced in each of these secondary windings is dependent upon the applied voltage and the turns ratio of the transformer, as is well understood. In this embodiment the voltage produced in each secondary winding is of the order of 300 volts. The secondary 100 has one terminal connected through conductor 104 to a fixed contact 106 engageable by reed 82 within the vibrator 26, while the other terminal of the secondary winding 100 is connected through conductor 108 to one electrode 48 of the gaseous discharge tube 36. In a similar manner the secondary winding 102 has one of its terminals connected to the fixed contact 110 engageable by reed 82 within the vibrator 26 through conductor 112, while the other terminal of the transformer secondary 102 is connected through conductor 114 to the remaining electrode 50 within the discharge tube 36. The fixed contacts 106 and 110 within the vibrator 26 are engageable by reed 82 and complete circuits through said reed and conductor 116 to a common connection 118 between two sections 120 and 122 of the condenser 28. Each of the remaining terminals of the series combination of condenser sections 120 and 122 is connected to one of the conductors 108 and 114. Thus, when the reed 82 is moved to the left in Fig. 3 under the magnetic influence of coil 84, the contact 110 is engaged, whereby the secondary circuit including winding 102 is completed and the condenser section 122 receives an electrical charge. Similarly, when the reed 82 returns to the right in Fig. 3 under its spring tension, the fixed contact 106 is engaged thereby to complete the circuit which includes transformer secondary 100 to produce an electrical charge on the condenser section 120. In this embodiment, condensers 120, 122, 124 and 126 are incorporated into a single cylindrical housing 28 and conveniently contained with handle section 14. Other configurations may be employed.

The secondary windings 100 and 102 are so oriented that the voltages produced on condenser sections 120 and 122 will be in additive relation. Therefore, a resultant voltage will be produced on condenser section 124, which is connected in parallel with the series combination of condenser sections 120 and 122, which is the sum of the voltages appearing on these sections.

The charges accumulating on these condensers, and the rate of charge of each section will depend upon the relative capacitances thereof. In this embodiment, sections 120 and 122 are .3 mfd and section 124 is 1.6 mfd.

The manner in which the combination of transformer 34 and vibrator 26 functions to produce a D. C. output should be understood. The fixed contact 78 associated with the upper primary winding in transformer 34 is disposed opposite the fixed contact 106, which is in circuit with the upper secondary winding 100. Therefore, each time the reed 82 in vibrator 26 moves to the right from the position in which it engages contact 78 to the position in which it engages contact 106, the transformer primary 70 will be de-energized to produce a collapsing flux within the core structure, and the transformer secondary circuit will be completed whereby this collapsing flux will produce a unilateral current therein. When the reed 82 moves to the left on the next half-cycle of vibrator operation the secondary circuit will be opened prior to the completion of the primary circuit—that is, the reed 82 will leave the contact 106 before engaging the primary circuit contact 78. Thus, the rising flux resulting from the completion of the primary circuit through contact 78 will not produce a reverse current in the secondary as that circuit has been previously opened by reed 82. The condenser 126 has a relatively small capacitance, functioning merely as a buffer condenser in parallel with the transformer secondary 100. It is believed obvious that all of the energy stored in condenser 124 is available for rapid discharge between the electrodes 48 and 50 to produce a high intensity glow within the gaseous discharge tube 36 once a trigger impulse is received from the engine through trigger coil 40.

While the apparatus herein described is adapted for use on two known voltages, it is believed manifest that additional taps may be added to the primary windings of the transformer 34 and an additional voltage sensitive device, such as relay 32, added corresponding to each tap on the transformer whereby predetermined output characteristics will be maintained for any number of known input voltages. For example, the particular embodiment herein described is adapted to operate from six and twelve volts. By adding a series winding to each of the primary windings of transformer 34 and connecting the free terminals thereof to the normally open contacts of a transfer switch having a coil actuated at a voltage about twelve volts, it is clear that a third possible input voltage is accommodated. Furthermore, although the power supply herein described is illustrated in combination with an engine timing light and is especially useful in this combination, other uses will occur to one skilled in the art, all of which are within the spirit and scope of this invention.

Furthermore, while this invention is particularly described in connection with an embodiment employing a voltage doubler circuit, various other power supplies could be employed such as simple vibrator self-rectifier circuits or full or half wave tube rectifier circuits without departing from the teaching of this invention.

While a particular embodiment of the invention has been shown, it will be understood, of course, that the invention is not limited thereto since many modifications may be made and it is, therefore, contemplated by the appended claims to cover any such modifications as fall within the true spirit and scope of the invention.

The invention having thus been described, what is claimed and desired to be secured by Letters Patent is:

1. Electrical apparatus for producing a timed visible impulse selectively from one of two known D. C. voltage sources comprising relay means having a coil and contact means actuatable thereby, input terminals for connection to said voltage sources, said coil being connected to said input terminals, said contact means having a first position and a second position in accordance with the energization of said actuating coil from said one and said other one, respectively, of said voltage sources, a transformer having two primary winding means and a secondary winding, circuit interrupter means connected to be energized from said voltage sources through said input terminals and having oscillating contacts in circuit with said terminals and said primary winding means for periodically interrupting energizing circuits therefor, circuit means controlled by said contact means for completing an energizing circuit for said one primary winding means from said one source and for said other primary winding means from said other source, respectively, in accordance with the energization of said actuating coil, [said interrupter means including further oscillating contact means in circuit with said secondary winding,] condenser means connected in circuit with said secondary winding [and said further oscillating contacts] for charging said condenser means during operation, and gas-filled light means having a pair of power electrodes connected to said condenser means and a trigger electrode to control said timed impulses.

2. Electrical apparatus for producing a timed visible impulse selectively from one of two known D. C. voltage sources, one of which has a magnitude equal to substantially one-half of the other comprising relay means having a coil and contact means actuatable thereby, input terminals for connection to said voltage sources, said coil being connected to said input terminals, said contact means having a first position corresponding to the unenergized condition of said coil and a second position corresponding to energization of said coil with a voltage greater than a predetermined value intermediate the magnitude of said two voltage sources, said coil being wound to effect said first and said second contact means positions when energized from said one and said other one, respectively, of said voltage sources, a transformer having a center-tapped primary winding and a secondary winding, a circuit interrupter means connected to be energized from said voltage source through said terminals and having oscillating contacts in circuit with said terminals and said primary windings for periodically interrupting energizing circuits therefor, an operating coil for actuating said oscillating contacts, circuit means controlled by said contact means for completing an energizing circuit from said one source to the portion of said primary winding extending from the center tap to one end thereof and from said other source to said whole primary winding, respectively, in accordance with the energization of said actuating coil, said operating coil being connected across said primary winding portion, [said interrupter means including further oscillating contact means in circuit with said secondary winding,] condenser means connected in circuit with said secondary winding [and said further oscillating contacts] for charging said condenser means during operation, and gas-filled light means having a pair of power electrodes connected to said condenser means and a trigger electrode to control said timed impulses.

3. Electrical apparatus for producing a predetermined potential output selectively from one of two known D. C. voltage sources one of which has a magnitude greater than the other comprising relay means having a coil and contact means actuatable thereby, input terminals for connection to said terminal sources, said coil being connected to said input terminals, said contact means having a first position corresponding to the unenergized condition of said coil and a second position corresponding to energization of said coil with a voltage greater than a predetermined value intermediate the magnitude of said two voltage sources, said coil being wound to effect said first and second contact means positions when energized from said one and said other one, respectively of said voltage sources, a transformer having a tapped primary winding and a secondary winding, circuit interrupter means connected to be energized from said voltage sources through said terminals and having oscillating contacts in circuit with said terminals and said primary winding for periodically interrupting energizing circuits therefor, said interrupter means including an operating coil for actuating said oscillating contacts, and circuit means controlled by said contact means for completing an energizing circuit from said one source to a portion of said primary winding extending from the tap to one end thereof and from said other source to said whole primary winding, respectively in accordance with the energization of said actuating coil, said operating coil being connected across said primary winding portion, [said interrupter means including further oscillating contact means in circuit with said secondary winding,] condenser means connected in circuit with said secondary winding [and said further oscillating contact means] for charging said condenser means during operation, and gas-filled light means having a pair of power electrodes connected to said condenser means and a terminal electrode to control said timed impulses.

4. Electrical apparatus for producing a predetermined potential output selectively from one of two known D. C. voltage sources one of which has a magnitude greater that the other comprising relay means having a coil and contact means actuable thereby, input terminals for connection to said terminal sources, said coil being connected to said input terminals, said contact means having a first position corresponding to the unenergized condition of said coil and a second position corresponding to energization of said coil with a voltage greater than a predetermined value intermediate the magnitude of said two voltage sources, said coil being wound to effect said first and second contact means positions when energized from said one and said other one, respectively of said voltage sources, a transformer having a tapped primary winding and a secondary winding, circuit interrupter means connected to be energized from said voltage sources through said terminals and having oscillating contacts in circuit with said terminals and said primary winding for periodically interrupting energizing circuits therefor, said interrupter means including an operating coil for actuating said oscillating contacts, and circuit means controlled by said contact means for completing an energizing circuit from said one source to a portion of said primary winding extending from the tap to one end thereof and from said other source to said whole primary winding, respectively in accordance with the energization of said actuating coil, said operating coil being connected across said primary winding portion.

References Cited in the file of this patent or the original patent

UNITED STATES PATENTS

| | | |
|---|---|---|
| 1,844,790 | Noviel et al. | Feb. 9, 1932 |
| 1,882,473 | Beetem | Oct. 11, 1932 |
| 2,071,984 | Minneci | Feb. 23, 1937 |
| 2,073,247 | Miller | Mar. 9, 1937 |
| 2,082,607 | Amsden | June 1, 1937 |
| 2,157,417 | Kneisley | May 9, 1939 |
| 2,262,819 | Rosser | Nov. 18, 1941 |
| 2,290,264 | Wuerfel | July 21, 1942 |
| 2,344,518 | Morgan et al. | Mar. 21, 1944 |
| 2,347,165 | Aust | Apr. 25, 1944 |
| 2,410,369 | Sziklai | Oct. 29, 1946 |
| 2,475,994 | Short | July 12, 1949 |
| 2,492,247 | Weaving et al. | Dec. 27, 1949 |
| 2,680,832 | Schultz | June 8, 1954 |

FOREIGN PATENTS

| | | |
|---|---|---|
| 538,673 | Great Britain | Aug. 12, 1941 |